United States Patent
Baillod et al.

(10) Patent No.: US 6,641,052 B2
(45) Date of Patent: Nov. 4, 2003

(54) SYSTEM AND METHOD FOR AUTHENTICATION OF THE CONTENTS OF CONTAINERS

(75) Inventors: Robert Baillod, Beaconsfield (CA); Marc H. Choko, Montreal (CA); Daniel Leyni-Barbaz, Montreal (CA); Arcadie Choko, Boulogne (FR)

(73) Assignee: Procap Technologies, Montreal (CA)

( * ) Notice: Subject to any disclaimer, the term of this patent is extended or adjusted under 35 U.S.C. 154(b) by 205 days.

(21) Appl. No.: 09/875,164

(22) Filed: Jun. 7, 2001

(65) Prior Publication Data

US 2002/0185544 A1 Dec. 12, 2002

(51) Int. Cl.[7] .............................................. G06K 19/06
(52) U.S. Cl. ..................... 235/494; 235/487; 215/250; 40/311
(58) Field of Search ................... 235/375, 385, 235/487, 494; 425/809; 215/365, 230, 47, 250, 200, 253; 40/310, 311; 340/572.1, 572.8; 283/72, 98, 102

(56) References Cited

U.S. PATENT DOCUMENTS

| | | | | |
|---|---|---|---|---|
| 610,149 A | * | 8/1898 | Seaman | 215/250 |
| 741,307 A | * | 10/1903 | Chapman | 215/250 |
| 765,439 A | * | 7/1904 | Pike | 215/230 |
| 2,141,722 A | * | 12/1938 | Morgan | 40/311 |
| 4,436,223 A | | 3/1984 | Wilson | |
| 4,460,106 A | | 7/1984 | Moulding, Jr. et al. | |
| 4,580,721 A | | 4/1986 | Coffee et al. | |
| 4,749,847 A | * | 6/1988 | Despres | 235/487 |
| 5,012,941 A | * | 5/1991 | Abrams et al. | 215/250 |
| 5,014,798 A | | 5/1991 | Glynn | |
| 5,553,728 A | * | 9/1996 | Finke | 215/230 X |
| 5,566,441 A | * | 10/1996 | Marsh et al. | 29/600 |
| 5,605,738 A | * | 2/1997 | McGinness et al. | 428/195 |
| 5,654,022 A | * | 8/1997 | Sayre | 426/118 |
| 5,762,377 A | * | 6/1998 | Chamberlain | 283/67 |
| 5,924,739 A | | 7/1999 | Garbutt | |
| 6,042,004 A | | 3/2000 | Domiteaux et al. | |
| 6,100,804 A | | 8/2000 | Brady et al. | |
| 6,113,720 A | | 9/2000 | Fresnel | |
| 6,137,413 A | * | 10/2000 | Ryan, Jr. | 340/572.8 |
| 6,158,613 A | | 12/2000 | Novosel et al. | |
| 6,460,713 B1 | * | 10/2002 | Oatley et al. | 215/230 X |
| 2002/0024215 A1 | * | 2/2002 | Wong | 283/72 |
| 2002/0057201 A1 | * | 5/2002 | Manov et al. | 340/572.1 |

FOREIGN PATENT DOCUMENTS

| | | | |
|---|---|---|---|
| DE | 299 19 460 U | | 2/2000 |
| DE | 198 52 527 A | | 5/2000 |
| EP | 0 269 317 A | | 6/1988 |
| EP | 0 619 243 A1 | * | 10/1994 |
| EP | 1 083 519 A2 | * | 3/2001 |
| GB | 2337045 A | | 11/1999 |
| WO | WO 02/45053 A1 | * | 6/2002 |

* cited by examiner

Primary Examiner—Jared J. Fureman
(74) Attorney, Agent, or Firm—Ogilvy Renault; Robert Mitchell

(57) ABSTRACT

A system for guarantying the authenticity of the contents of a container closed by a closure. The system comprises a data carrier storing some encoded information that can be translated to confirm the authenticity of the contents of a container tagged with the data carrier. The data carrier preferably includes a RFID marker and a chemical marker integrated into an anti-tampering device adapted to be non-removably secured to the closure of the container so as to be damaged as a result of an attempt at removing the closure from the container.

22 Claims, 4 Drawing Sheets

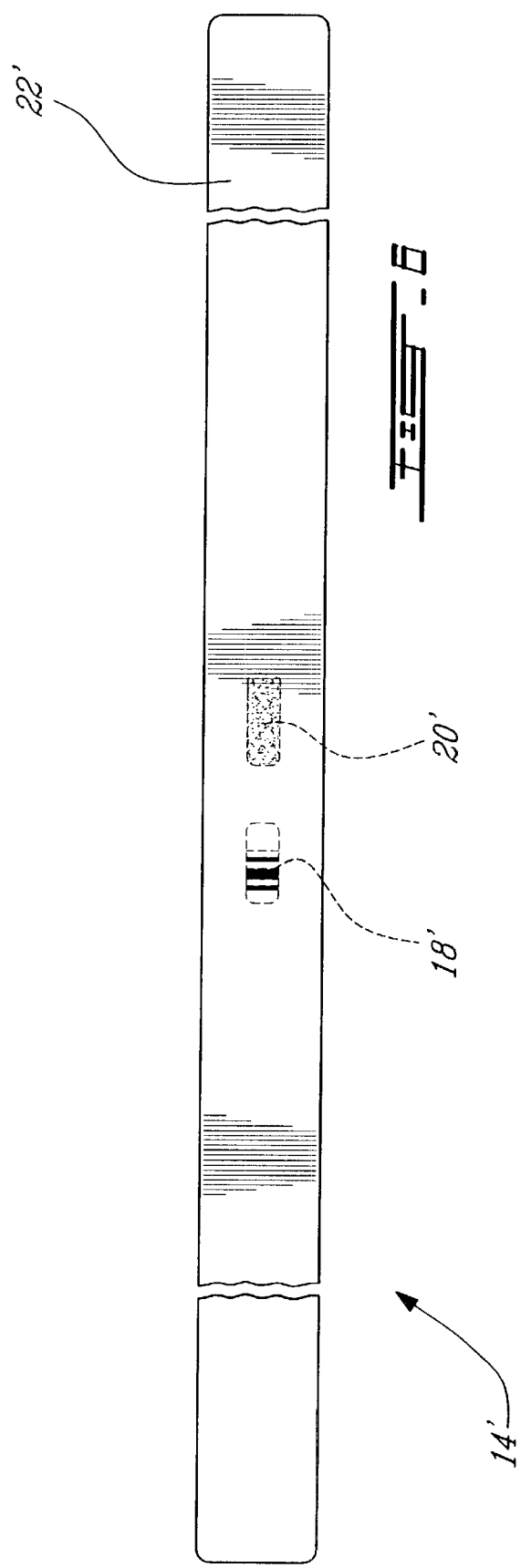

US 6,641,052 B2

SYSTEM AND METHOD FOR AUTHENTICATION OF THE CONTENTS OF CONTAINERS

BACKGROUND OF THE INVENTION

1. Field of the Invention

The present invention relates to product information devices and, more particularly, to a system and a method for authentication of the contents of containers, such as wine bottles.

2. Description of the Prior Art

Typically, wine bottles are identified by information labels glued on the bodies of the bottles near respective bases thereof. Some bottles are also authenticated by means of authentication symbols integrally formed on the bottle itself.

One drawback of these conventional bottle authentication systems resides in the fact that they do not prevent one from opening a bottle and substituting the contents thereof with a product of less value before re-encapsulating the bottle.

There is, thus, a need for a new authenticating system and method for guaranteeing the originality of a container's contents, as opposed to the originality of the container itself.

SUMMARY OF THE INVENTION

It is therefore an aim of the present invention to provide an authentication system which enhances the resistance to tampering or adulteration of the contents of a container, such as a wine bottle.

It is also an aim of the present invention to provide such an authentication system which provides product information while the container is still closed.

It is a further aim of the present invention to provide a new method for authenticating the contents of a container.

Therefore, in accordance with the present invention, there is provided a system for authentication of the contents of a container assembly of the type having a container closed by a closure, the system comprising a data carrier adapted to be affixed to the container assembly so as to be damaged by attempts to remove the closure from the container, said data carrier containing encoded information on the contents of the container for allowing verification of the authenticity thereof while the container is still closed by the closure.

In accordance with a further general aspect of the present invention, there is provided a system for ensuring the authenticity of the contents of a bottle assembly having a bottle defining an opening closed by a cork, comprising a data carrier storing some encoded information that can be deciphered to confirm the authenticity of the contents of a closed bottle assembly tagged with said data carrier, wherein said data carrier includes at least one ID marker integrated into an anti-tampering device adapted to be non-removably secured to the bottle assembly so as to be damaged as a result of an attempt at removing the cork from the bottle.

In accordance with a further general aspect of the present invention, there is provided a method of ensuring the originality of the contents of a container, comprising the steps of: providing a data carrier, encoding said data carrier with information on the contents of a container so that information carried by said data carrier is subsequently available for decoding in order to validate the originality of the contents of the container, and securing the container against adulteration of the contents thereof by affixing said data carrier to the container so that upon attempts of opening said container said data carrier will be damaged.

BRIEF DESCRIPTION OF THE DRAWINGS

Having thus generally described the nature of the invention, reference will now be made to the accompanying drawings, showing by way of illustration a preferred embodiment thereof, and in which:

FIG. 6 is a top plan view of the data carrier of FIG. 5.

DESCRIPTION OF THE PREFERRED EMBODIMENTS

Figure 1:
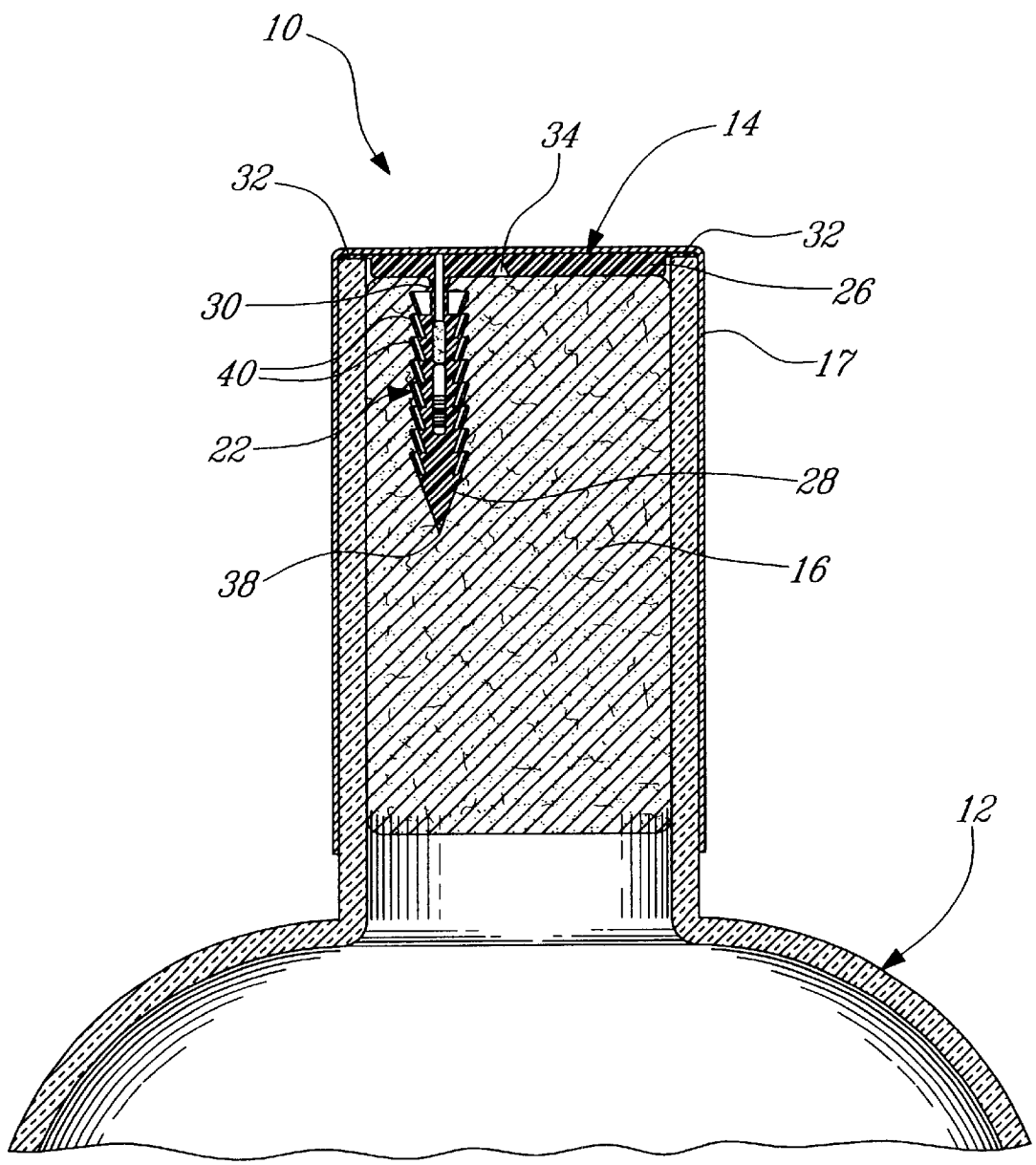
FIG. 1 is an enlarged vertical cross-sectional view of a wine bottle having a data carrier inserted into a cork of the bottle in accordance with a first embodiment of the present invention.

Now referring to the drawings, and in particular to FIG. 1, a system 10 for authenticating the contents of a container, such as a wine bottle, and embodying the elements of the present invention will be described.

More specifically, the system 10 includes a data carrier 14 adapted to be irreversibly driven into a cork 16 of a given wine bottle 12 so as to be damaged if someone attempts to open the bottle 12 with a corkscrew (not shown). The data carrier 14 can be driven through the bottle capsule 17 or introduced into the cork 16 prior to the application of the capsule 17 on the neck of the bottle 12 so as to be concealed therebehind. The data carrier 14 is encoded with relevant information on the contents of the bottle 12 to be tagged, such as the name of the wine, the winery, the winemaker, the vintage, etc. In this way, the data carried by the data carrier 14 can be subsequently translated into useful information which can be used to validate the originality or authenticity of the contents of the bottle.

Figure 2:
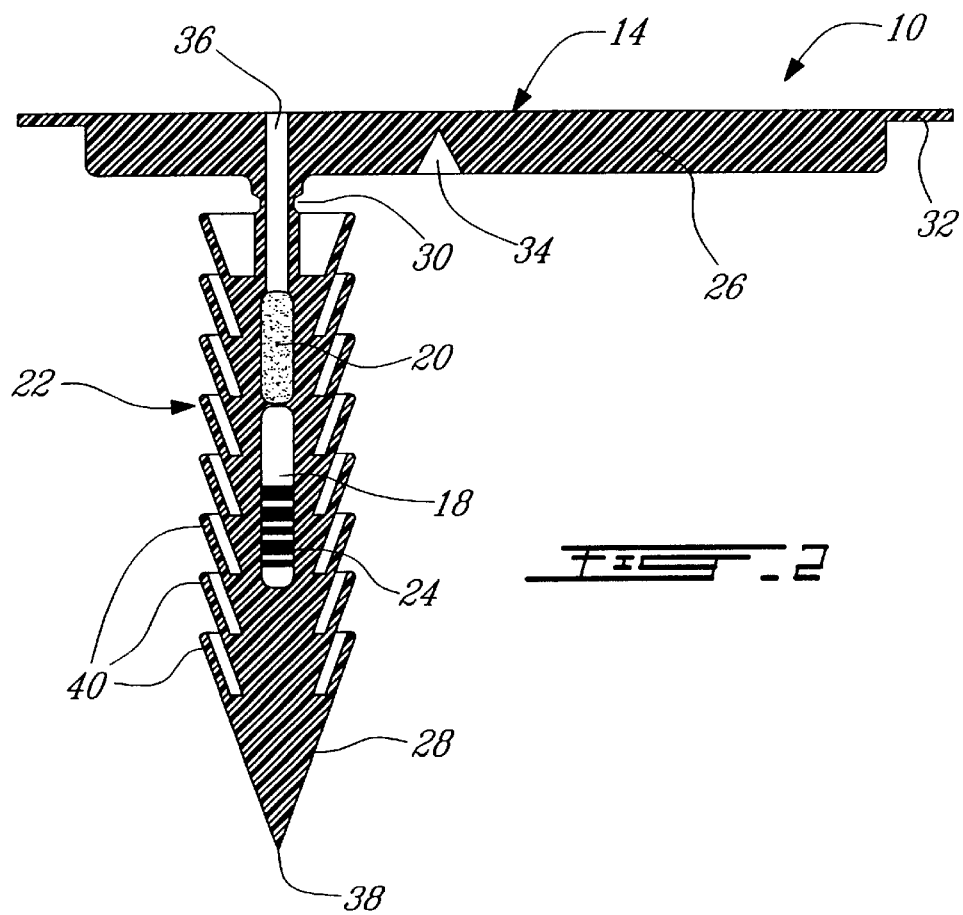
FIG. 2 is a vertical cross-sectional view of the data carrier illustrated in FIG. 1.

As shown in FIG. 2, the data carrier 14 includes a pair of identification (ID) tags or markers 18 and 20. To secure the bottle 12 against adulteration of its contents and to prevent the ID markers 18 and 20 from being substituted by pirated markers, the ID markers 18 and 20 are integrated into the body of an anti-tampering device 22 forming the physical support of the data carrier 14. As will be seen hereinafter, the anti-tampering device 22, once installed, cannot be removed without being damaged. To further secure the contents of the bottle and, thus, guarantee the authenticity thereof, the ID markers 18 and 20 are preferably integrally formed with the anti-tampering device 22. In this way, it becomes virtually impossible for a defrauder to isolate the ID markers 18 and 20 from their associated anti-tampering device 22 and subsequently place them in an anti-tampering device reproduction after the original contents of the bottles 12 has been replaced by another product of less value.

According to a preferred embodiment of the present invention, the first ID marker 18 consists of a radio frequency identification (RFID) transponder, whereas the second ID marker 20 consists of a chemical marker. It is understood that only one ID marker could be provided. However, it is preferable to use two different ID markers to allow for a twofold validation of the contents of the tagged bottle 12.

The RFID transponder 18 is preferably of the passive type (i.e. without an independent power source) and comprises a microchip schematically represented at 24 in FIG. 2 and an antenna (not shown) electrically connected to the microchip 24. The RFID transponder 18 is associated with the contents of a given bottle and programmed accordingly to return a signal when queried remotely by an interrogating circuit so as to provide selected information concerning the contents of the tagged bottle 12. The interrogating circuit can take the form of a portable RFID reader (not shown). The authenticity of the tagged bottle 12 can be quickly and readily validated by simply bringing a portable RFID reader within the operative zone of the RFID transponder 18. When the portable RFID reader is brought near the RFID transponder 18, while the same is located in the cork 16 of the bottle 12, inductive coupling occurs and the transponder 18 is powered by the RF carrier signal being emitted by the reader. While the RFID transponder 18 is active, it modulates the RFID reader with the information.

The RFID marker 18 can also be used to do some product tracking such as satellite tracking and to record temperature variations of the bottle's contents. Furthermore, the RFID marker could be used in quality and production control operations. The RFID marker could form part of a satellite tracking system or anti-tampering system using GPS technologies.

The chemical marker 20 has a predetermined composition which is associated with product data stored in a database. Therefore, one has simply to extract a sample of the chemical marker, analyze the sample to determine its composition and then search in the database what information is associated with this particular composition. The chemical analysis could be performed according to the scientific principles of analytical chemistry. The chemical marker can also be used to give temperature information.

The chemical marker 20 has a chemical component. A section of the marker 20 includes chemical agents and/or biological agent (chemical molecule, biological molecule or genetic material). The marker 20 can include one or more agents. These agents are encapsulated or microencapsulated or even free. The agents can be microencapsulated in polymeric or non-polymeric matrixes. The agents can also be in pharmaceutical forms such as gel, unguent, cream, pellet, microsphere, caplet, capsule or liquid.

As illustrated in FIG. 2, the anti-tampering device 22 includes a head portion 26 and a stem portion 28. A frangible connection 30 is provided between the head portion 26 and the stem portion 28 to cause the head portion 26 to be separated from the stem portion 28 when one pulls on the head portion 26 with a view to withdraw the device 22 from the cork 16 in which it is inserted.

In the illustrated embodiment, the RFID marker 18 and the chemical marker 20 are integrated in the stem portion 28 of the anti-tampering device 22. However, it is understood that the markers 18 and 20 could be placed in different parts of the device 22, for instance in either one of the head portion 26 and the stem portion 28.

Figure 3:
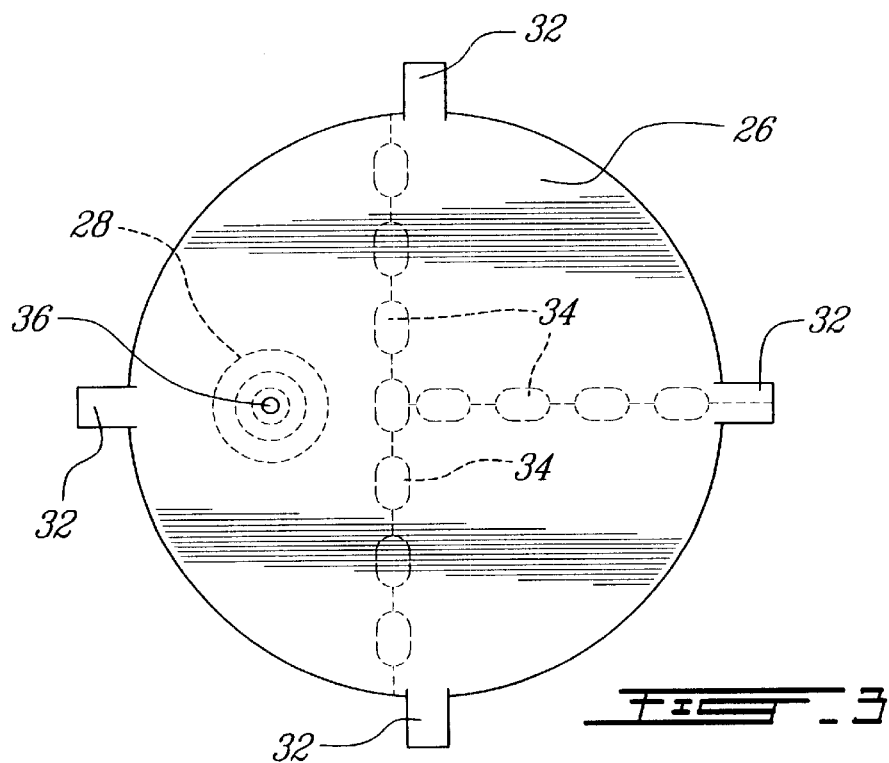
FIG. 3 is a top plan view of the data carrier of FIG. 2.

As shown in FIGS. 2 and 3, the head portion 26 forms an insulating, flexible substrate for the microchip 24. The head portion 26 is preferably molded so that the microchip 24 and the associated antenna forms an integral part thereof. It is also contemplated to locate the microchip 24 in the stem portion 28 and the antenna in the head portion 26.

In the illustrated embodiment, the anti-tampering device 22 is molded as a single piece of material, such as plastic, metal or composite materials. However, the head portion 26 and the stem portion 28 could be molded into two separate pieces that are subsequently assembled to one another.

The head portion 26 is provided in the form of disc adapted to overly the top surface of the cork 16 once the stem portion 28 has been driven into the cork 16. Circumferentially spaced-apart tabs 32 extend radially outwardly from the periphery of the head portion 26 for extending over the rim surrounding the mouth of the bottle 12. The tabs 32 are frangibly connected to the head portion 26 so as to be broken in the event that someone pushes the cork 16 into the bottle 12, thereby providing clear evidence that there has been an attempt to open the bottle 12.

As shown in FIG. 3, weakening lines 34 are defined in the head portion 26 to increase the fragility thereof. A reference mark 36 is defined on the top surface of the head portion 26 to indicate where a sampling tool, such as a syringe, should be inserted to reach the chemical marker 20. It is contemplated to use the remaining area of the top planar surface of the head portion 26 as an information panel.

As can be appreciated from FIGS. 2 and 3, the stem portion 26 is off-centered relative to the head portion 26 in order that a cork screw driven through the cork 16 in a conventional manner for legitimately opening the bottle 12 does not direct either of the RFID marker 18 and the chemical marker 20 into the contents of the bottle 12. Furthermore, the stem portion 26 has a pointed leading end 38 and a series of axially spaced-apart anchoring members 40 extending angularly from the stem portion 26 in a direction away from the leading end 38 thereof. Each anchoring member 40 is provided in the form of a frusto-conical skirt extending about a core of the stem portion 26. The function of the anchoring members 40 is to prevent the anti-tampering device 22 from being withdrawn from the cork 16 once it has been driven therein with the undersurface of the head portion 26 resting on the top surface of the cork 16, as illustrated in FIG. 1.

In use, the data carrier 14 is driven into the cork 16 of a bottle 12 to be protected. Before, being driven into the cork 16, the markers 18 and 20 of the data carrier 14 are encoded with the desired information on the contents of the bottle 12. When it is desired to validate the authenticity of the contents of the bottle 12, one has simply to bring a RFID reader near the neck or the top of the bottle so as to read the information stored on the RFID marker 18. This information can be confirmed by sampling and analyzing a portion of the chemical marker 20. Based on the results of the analysis of the collected sample, the relevant information on the contents of the bottle 12 are recovered in a data base storing all the information corresponding to various compositions of chemical markers 20.

Figure 4:
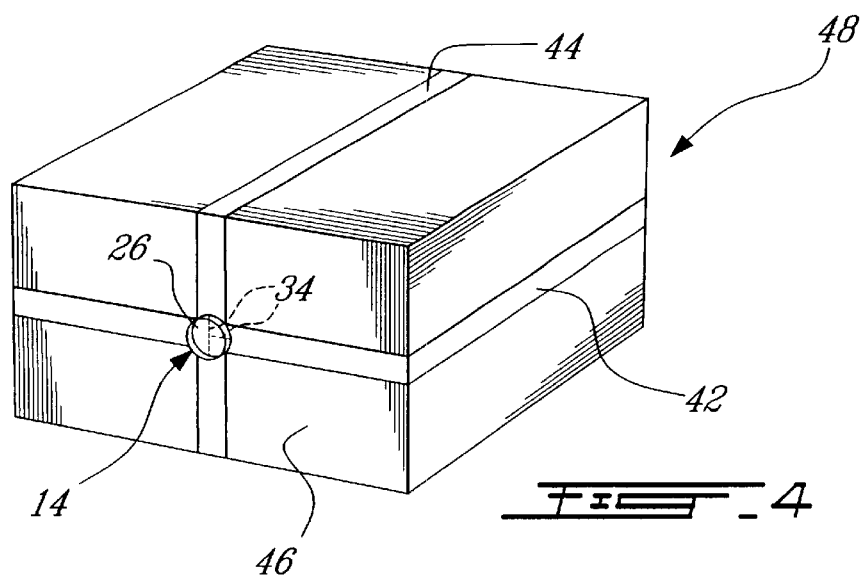
FIG. 4 is a perspective view of a data carrier installed on a case in accordance with a second embodiment of the present invention.

FIG. 4 illustrates a further application of the present invention, wherein the data carrier 14 illustrated in FIGS. 1 to 3 is driven through a pair of securing strips 42 and 44 at a junction thereof and into a wooden cover 46 of a wooden case 48. The strips 42 and 44 extend perpendicularly to each other about the case 48. To remove the cover 46 from the case 48, one has to cut the strips 42 and 44, thereby allowing a user to immediately detect any tampering with possible substitution of the case's contents. The strips 42 and 44, once cut, cannot be replaced by similar strips because of the impossibility of removing the data carrier 14 without breaking it, as explained hereinbefore with respect to FIGS. 1 to 3.

Figure 5:
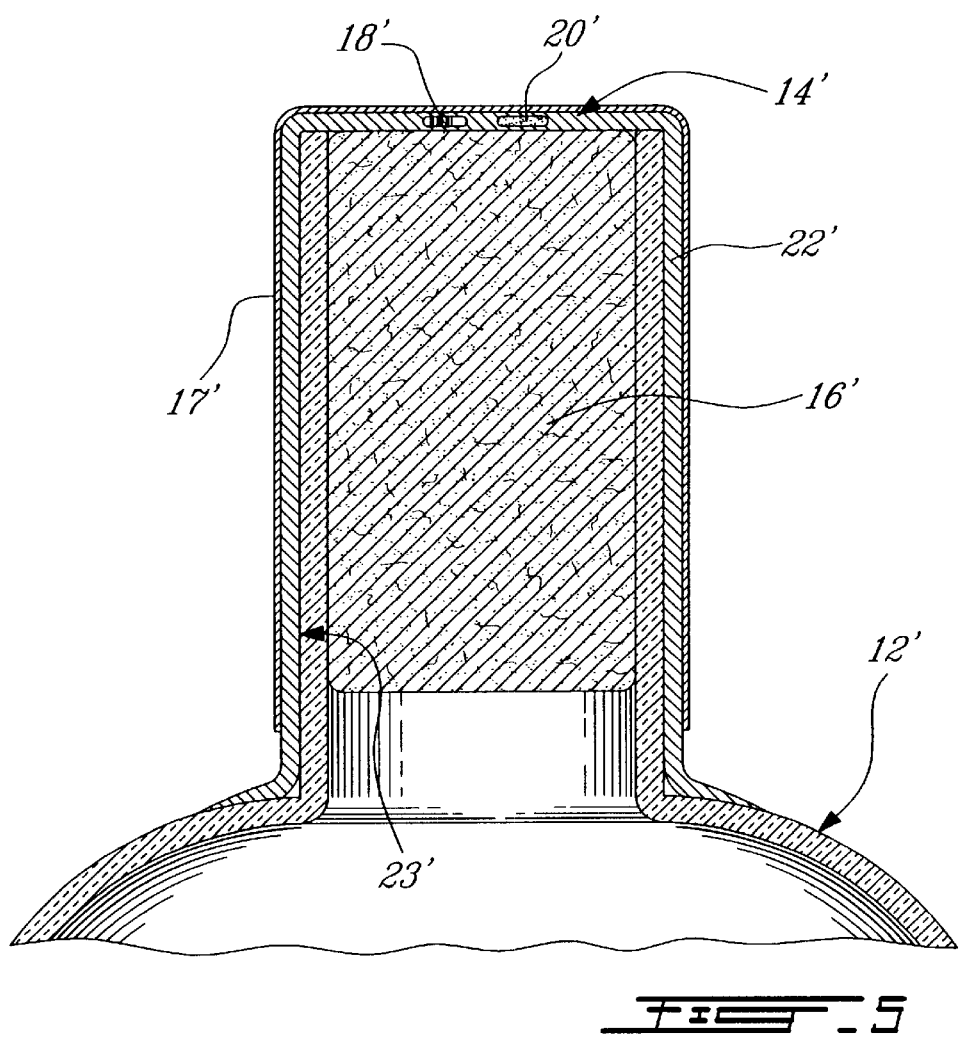
FIG. 5 is an enlarged vertical cross-sectional view of a wine bottle having a data carrier secured over a cork of the bottle and the neck thereof in accordance with a third embodiment of the present invention.

FIGS. 5 and 6 illustrate another construction of a data carrier 14' wherein a RFID marker 18' and a chemical marker 20' are integrated into an anti-tampering tape 22'. The tape 22' has an adhesive layer 23' applied on an undersurface thereof for allowing the tape 22' to be permanently secured on a bottle 12' with a first portion of the tape 22' extending over the neck of the bottle 12' and a second portion extending over the top surface of a cork 16' inserted in the neck of bottle 12' to close the same. This construction of the data carrier 14' can also be used jointly with a pair of securing strips to secure the contents of a case against tampering and allow ready verification thereof.

What is claimed is:

1. A system for authentication of contents of a container assembly of a type having a container closed by a closure, the system comprising a data carrier adapted to be affixed to the container assembly so as to be damaged by attempts to remove the closure from the container, said data carrier containing encoded information on the contents of the container for allowing verification of the authenticity thereof while the container is still closed by the closure, wherein said data carrier includes at least one ID marker integrated to an anti-tampering structure having a stem portion, and wherein said anti-tampering structure further includes at least one band adapted to tightly encompass the closure and the container, said stem portion extending through said at least one band.

2. A system as defined in claim 1, wherein said anti-tampering structure is at least partly frangible so that attempts at removing said anti-tampering structure from the container assembly will damage said anti-tampering structure.

3. A system as defined in claim 1, wherein said at least one ID marker is integrally formed with said anti-tampering structure, whereby attempts at removing said ID marker from said anti-tampering structure will result in damages to said ID marker.

4. A system as defined in claim 3, wherein said anti-tampering structure is molded about said at least one ID marker.

5. A system as defined in claim 1, wherein said anti-tampering structure is adapted to be anchored into the closure of the container assembly.

6. A system as defined in claim 5, wherein said anti-tampering structure includes a marker support having a head portion and a stem portion, said stem portion being adapted to be driven into the closure, and wherein said stem portion is provided with anchoring means to oppose removal of said anti-tampering structure from the closure.

7. A system as defined in claim 6, wherein a weakened portion is provided between said head portion and said stem portion.

8. A system as defined in claim 6, wherein said stem portion is adapted to be non-removably driven into a cork of a bottle with said head portion at least partly overlying an opening surrounding rim of the bottle.

9. A system as defined in claim 6, wherein said head portion is provided in a form of a disc, and wherein said stem portion is off-centered relative to said disc.

10. A system as defined in claim 1, wherein said at least one ID marker includes two different ID markers to provide a twofold validation of the contents of the container assembly.

11. A system as defined in claim 10, wherein said at least two ID markers include a RFID marker and a chemical marker.

12. A system as defined in claim 11, wherein said RFID marker includes an electronic microchip and an antenna, said microchip and said antenna being located in different ones of a head portion and a stem portion of said anti-tampering structure.

13. A system as defined in claim 11, wherein a reference mark is provided on said anti-tampering structure for indicating an access to said chemical marker in said anti-tampering structure.

14. A system as defined in claim 1, wherein said anti-tampering structure includes a tape adapted to be non-removably secured to the container assembly so as to extend over both the closure and the container thereof.

15. A system as defined in claim 14, wherein said at least one ID marker is sandwiched between a top and a bottom layer of said tape.

16. A system for ensuring the authenticity of a contents of a bottle assembly having a bottle defining an opening closed by a cork, comprising a data carrier storing some encoded information that can be deciphered to confirm the authenticity of the contents of a closed bottle assembly tagged with said data carrier, wherein said data carrier includes at least one ID marker integrated into an anti-tampering device adapted to be non-removably secured to the bottle assembly so as to be damaged as a result of an attempt at removing the cork from the bottler, wherein said anti-tampering device includes a marker support adapted to be irreversibly driven into the cork of the bottle, said marker support including a head portion and a stem portion, wherein said head is connected to said stem portion by a weakened portion.

17. A system as defined in claim 16, wherein said stem portion is provided with anchoring members to resist withdrawal of said marker support from the cork into which the marker support has been inserted.

18. A system as defined in claim 17, wherein said at least one ID marker is encapsulated within said marker support.

19. A system as defined in claim 16, wherein said at least one marker includes at least two different ID markers to provide for a twofold validation of the authenticity of the contents of the bottle.

20. A system for authentication of contents of a container assembly of a type having a container closed by a closure, the system comprising a data carrier adapted to be affixed to the container assembly so as to be damaged by attempts to remove the closure from the container, said data carrier containing encoded information on the contents of the container for allowing verification of the authenticity thereof while the container is still closed by the closure, wherein said anti-tampering structure is adapted to be anchored into the closure of the container assembly, and wherein said anti-tampering structure includes a marker support having a head portion and a stem portion, said stem portion being adapted to be driven into the closure, and wherein said stem portion is provided with anchoring means to oppose removal of said anti-tampering structure from the closure, and wherein a weakened portion is provided between said head portion and said stem portion.

21. A system for authentication of contents of a container assembly of a type having a container closed by a closure, the system comprising a data carrier adapted to be affixed to the container assembly so as to be damaged by attempts to remove the closure from the container, said data carrier containing encoded information on the contents of the container for allowing verification of the authenticity thereof while the container is still closed by the closure, wherein said anti-tampering structure is adapted to be anchored into the closure of the container assembly, and wherein said anti-tampering structure includes a marker support having a head portion and a stem portion, said stem portion being adapted to be driven into the closure, and wherein said stem portion is provided with anchoring means to oppose removal of said anti-tampering structure from the closure, and wherein said head portion is provided in a form of a disc, and wherein said stem portion is off-centered relative to said disc.

22. A system for authentication of contents of a container assembly of a type having a container closed by a closure, the system comprising a data carrier adapted to be affixed to the container assembly so as to be damaged by attempts to remove the closure from the container, said data carrier containing encoded information on the contents of the container for allowing verification of the authenticity thereof while the container is still closed by the closure, wherein said anti-tampering structure is adapted to be anchored into the closure of the container assembly, and wherein said anti-tampering structure includes a marker support having a head portion and a stem portion, said stem portion being adapted to be driven into the closure, and wherein said stem portion is provided with anchoring means to oppose removal of said anti-tampering structure from the closure, wherein said stem portion is adapted to be non-removably driven into a cork of a bottle with said head portion at least partly overlying an opening surrounding rim of the bottle.

* * * * *